March 5, 1957     C. F. L. KELSEY ET AL     2,783,659
MANUALLY OPERATED CONTROL MEANS FOR AUTOMOTIVE VEHICLES
Filed April 23, 1953
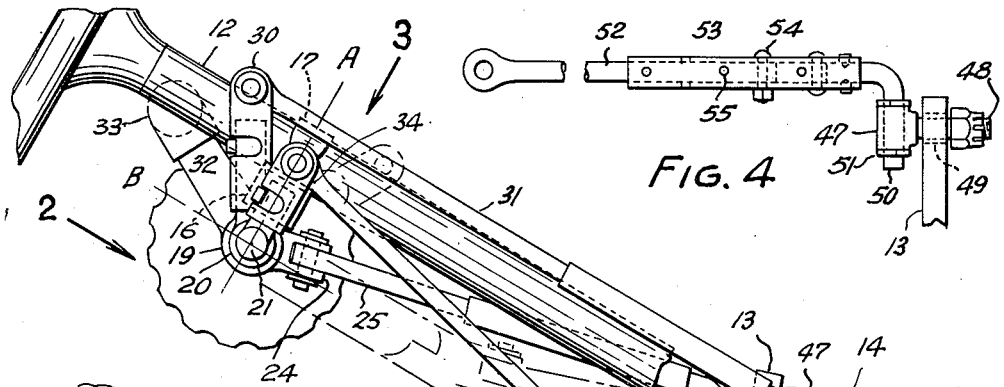
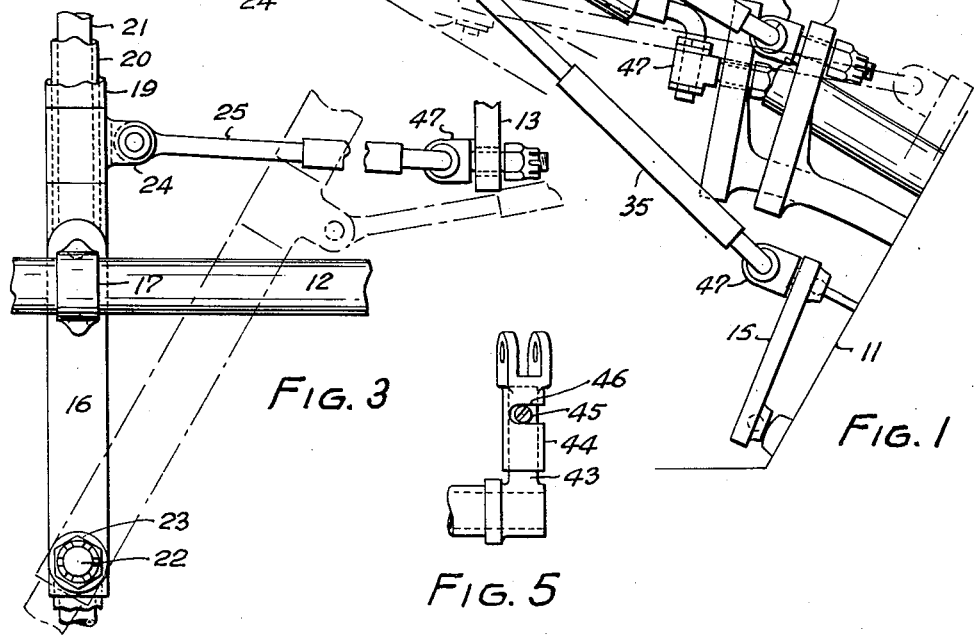
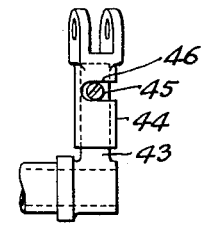
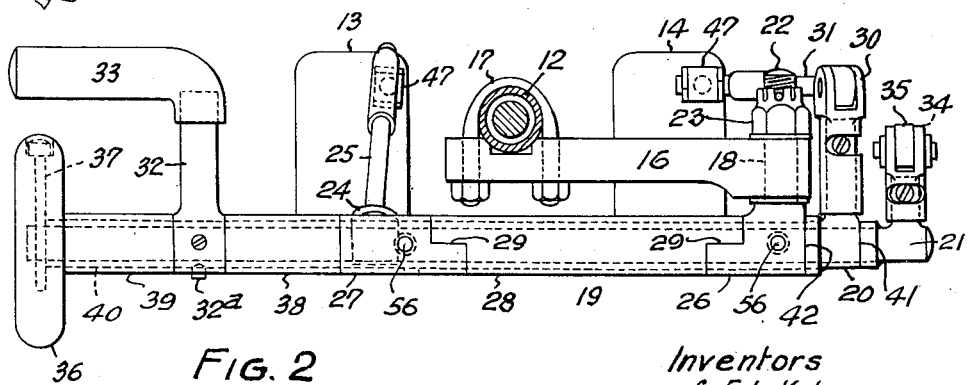
Inventors
C. F. L. Kelsey
G. W. Whalley
Attorney

United States Patent Office 2,783,659
Patented Mar. 5, 1957

2,783,659

MANUALLY OPERATED CONTROL MEANS FOR AUTOMOTIVE VEHICLES

Charles F. L. Kelsey and George W. Whalley,
Montreal, Quebec, Canada

Application April 23, 1953, Serial No. 350,728

5 Claims. (Cl. 74—481)

This invention relates to improvements in manually operated control means for automotive vehicles and the primary object of the invention is to provide means whereby persons deprived of the use of one or both legs or feet may easily and safely operate by hand the usual clutch, brake and accelerator pedals of an automotive vehicle. A further object is to provide means as aforesaid so constructed that it may be very easily applied to any make of left hand drive automotive vehicle, with only minor adjustments. A still further object is to provide means as aforesaid which will be equally serviceable for control of automotive vehicles having automatic clutches. Another object is to provide control means as aforesaid which, when installed in an automotive vehicle, will not interfere with control of the same in the usual manner. An additional object is to provide manual control means as aforesaid which is of simple and durable construction and which may be produced at relatively low cost. Various other objects and the advantages of the invention may be ascertained from the following description and the accompanying drawings.

Various means have already been proposed for accomplishing in part the primary object of this invention but such means have had the disadvantages of complicated and expensive construction and difficulty of application to an existing vehicle or have been peculiar to a particular make of vehicle and not readily adaptable to vehicles of other makes.

Broadly speaking, the invention consists in the provision of a manually operable means-assembly to be pivotally mounted on a fixed part of an automotive vehicle, such as the steering column thereof, for bodily swinging movement upwardly and downwardly in a plane transverse of the vehicle and inclining downwardly toward the front of the vehicle, said assembly including relatively revoluble elements each provided with means connecting it to a pedal of the vehicle in suchwise that one of said pedals will be operated by swinging movement of said means-assembly and another will be operated by rotation of one of said assembly elements relatively to the assembly, irrespective of swinging movement of the assembly.

In greater detail, the invention consists in the features and combinations of features herein disclosed, together with all such modifications thereof and substitutions of equivalents therefor as are within the scope of the appended claims.

The embodiment of our invention hereinafter described contemplates mounting of the swinging assembly on the steering column of an automotive vehicle for swinging movement as aforesaid; and also contemplates arrangement of the assembly elements in co-axial arrangement, one within another, but it will be understood that the invention is not limited to mounting on the steering column, as the assembly may be mounted on some other fixed part of the vehicle for movement as aforesaid; and also understood that the invention is not limited to co-axial relation of the assembly elements.

In the accompanying drawings which illustrate an embodiment of the invention now preferred but to the details of which the invention is not limited and in which, for clarity of illustration, the vehicle parts and certain of the control means assembly parts are shown somewhat out of their normal relative locations:

Fig. 1 is a side elevation of the control means showing the same mounted on the steering column of an automotive vehicle and connected to the pedals of the vehicle;

Fig. 2 is a view of the control means, as seen from the rear, looking in the direction of the arrow 2 of Fig. 1;

Fig. 3 is a view of the control means, as seen from above, looking down in the direction of the arrow 3 of Fig. 1;

Fig. 4 is an elevation of one of the links connecting the manual operating means to a pedal of the vehicle;

Fig. 5 is an elevation of one of the pedal actuating arms.

In the following description, to facilitate explanation and understanding of the invention, the various parts of the control means will be referred to as being in the positions they will occupy when the control means is operatively assembled to an automotive vehicle.

Referring more particularly to the drawings, 11 designates the inclined floor part of an automotive vehicle through which project the usual steering column 12, clutch pedal 13, brake pedal 14 and to which is attached an accelerator pedal 15, all of any usual construction and relative location.

As illustrated, the manual control means of this invention is pivotally mounted on a bracket 16 which is rigidly secured at one end to the steering column 12 by a clevis 17 and projects to the right hand side of the column, as considered from the driver's position. The free end of the bracket is formed with a bore 18 extending transversely of the length of the bracket, which bore is disposed in a plane, such as the plane A of Fig. 1, extending transversely of the vehicle and inclining downwardly and rearwardly of the vehicle. In many makes of automotive vehicles this plane will be normal, or substantially normal, to the axis of the steering column, as shown, but this exact relation is not essential as long as the axis of the bore 18 is so inclined that the manual control means assembly will swing about it in a suitably inclined plane below the steering column, as hereinafter described. It is immaterial whether the bracket be mounted on the steering column or on some other fixed part of the vehicle, as long as the bore is suitably inclined and is located to the right hand of the steering column and in such relation thereto that the control means assembly may swing in the desired plane. In consequence, the exact form of the bracket is immaterial and depends upon the part of the vehicle to which it is attached.

As illustrated, the manual control means comprises an assembly of three relatively rotatable, co-axially arranged elements 19, 20 and 21, of which the element 19 is the outermost and the element 21 the innermost; but it will be understood that the invention is not limited to co-axial arrangement of these elements. Considering the assembly as being in its normal, substantially horizontal position, extending transversely of a vehicle and viewed from the driver's position, the intermediate element 20 projects a short distance beyond the right hand end of the outer element 19 and the innermost element 21 projects a short distance beyond the right hand end of the intermediate element 20, all as shown in Fig. 2.

The assembly is pivotally mounted near its right hand end to the bracket 16 by means of a stud 22 projecting from the right hand end portion of the outer member, laterally thereof, and rotatably engaged in the bracket bore 18, wherein it is held by any suitable means, such as a castellated nut 23 threaded on the end of the stud 22 so as to be adjustable as desired and held against rotation by a cotter pin. The assembly, when in position, extends across the steering post for a suitable distance to the left hand thereof. Owing to the axial inclination of the bore 18, the assembly is constrained to swing in a plane, such as the plane B of Fig. 1, extending transversely of the vehicle and inclining downwardly and forwardly of the vehicle and toward the pedals. As shown, this plane is substantially parallel to the axis of the steering column but is not necessarily so, as the inclination is determined by the relative locations of the pedals and the assembly.

The outer member 19 is provided with means 24 for pivotal attachment of the upper end of a push rod 25, the lower end of which is adapted to be pivotally connected to the clutch pedal. This means 24 is so spaced from the stud 22 that it will be positioned to the left hand of the steering column, approximately in that vertical plane extending longitudinally of the vehicle which will contain the clutch pedal. The means 24 projects from the element 19 at approximately right angles to the axis of the pivot stud 22 and extends toward the clutch pedal, the exact angle being determined by the location of the clutch pedal with reference to the plane in which the assembly swings. The assembly may extend as far as necessary to the left of the push rod attaching means 24 to obtain a sufficient leverage for easy actuation of the clutch pedal. The outer element 19 may be a single tubular element carrying the pivot stud 22 at one end and the push rod attaching means 24 at the other end but is preferably formed in three parts, namely, a hub 26 carrying the stud 22, a hub 27 carrying the means 24, and a tubular spacer 28 extending between them. In order to hold the hubs 26 and 27 relatively irrevoluble, the adjacent ends of the hubs and spacer may be stepped, as shown at 29, for interlocking with one another. This arrangement enables the hubs to be located at any desired distance apart and the stud 22 and means 24 to be disposed in any desired angular relation to one another merely by using a spacer of suitable length, having the stepping of its ends in suitable angular relation.

The intermediate element 20 is revolubly mounted within the element 19 and carries at its right hand end portion, which projects beyond the element 19, a crank arm 30 extending laterally of the element and located to lie in that vertical plane extending longitudinally of the vehicle which contains the brake pedal 14. The upper end of a push rod 31 is pivotally connected to the free end of the arm 30 and the lower end of the rod is adapted to be pivotally connected to the brake pedal 14. A crank arm 32 is irrevolubly connected to the element 20 at a suitable distance to the left of the hub part 27 of element 19, as by set screws 32ª, and extends from the element in the same general direction as the arm 30. The outer end of the crank arm 32 carries a handle 33 extending to the left and approximately parallel with the element 20. The length of this handle is equal to at least the approximate width of a human hand.

The innermost element 21 is revolubly mounted in the intermediate element 20 and carries at its right hand end, which projects beyond the element 20, a crank arm 34 extending laterally of the element and located to lie approximately in that vertical plane extending longitudinally of the vehicle which contains the accelerator pedal 15. The upper end of a push rod 35 is pivotally connected to the free end of the arm 34 and its lower end is adapted to be pivotally connected to the accelerator pedal 15. The inner element 21 extends to the left beyond the intermediate element 20 for at least such distance as is necessary for the mounting thereon of an operating handle 36, beyond the end of the element 20 and approximately in line with the free end of the handle 33. The handle 36 is held irrevoluble with respect to the element 21 by a set screw 37 which preferably passes entirely through the element 21. The handle 36 is preferably of circular, or knob, form and of a size to fit comfortably in the palm of a driver's left hand, and its peripheral surface may be formed to afford a good grip. The handle 36 is also of such size as to leave a clearance between it and the end of the handle 33 ample for passage of a driver's fingers.

Tubular spacers 38 and 39 are mounted on the element 20 between the means 24 and the crank arm 32 and between the crank arm 32 and the handle 36. The portion 40 of the element 20 between the arm 32 and the handle 36 serves merely as a spacer and may be separate from the remainder of the element. The right hand portion of the inner element 21 may be shouldered at 41, as by provision of a collar thereon, for engagement with the end of the intermediate element 20 and the intermediate element may be similarly shouldered at 42, as by provision of a collar thereon, for engagement with the end of the outer element 19. The elements of the assembly are held against relative movement in their axial direction by the shoulders 41, 42 and the handle 36, or its set screw 37.

As the assembly swings in an inclined plane extending transversely of the vehicle while the arms 30 and 34 swing in planes normal to the said inclined plane and not necessarily those in which the pedals move, it is necessary to provide universal joint connections between the assembly and the push rods and between the push rods and the pedals. Any suitable form of universal joint will serve to compensate for the differences of arcuate movement and to prevent the pivotal connections binding. Arrangements which have been found satisfactory are shown in Figs. 4 and 5. In the arrangement, as shown in Fig. 5, each of the arms 30 and 34 is formed in two co-axial, relatively rotatable parts, for example an inner part 43 fixed to the related element 20 or 21 and a tubular outer part 44, bifurcated to receive the push rod, rotatable on the inner part and retained by a pin 45 passing through a slot 46 in the outer part and into the inner part, the slot extending part way around the outer part to permit of limited relative rotation of the parts. The connections of the push rods to the pedals preferably comprise a tubular bearing member 47 for each of the pedals 13, 14 and 15, having fixed thereto, as shown in Fig. 4, an attaching post 48 at right angles to the axis of the bearing, which post is designed to pass loosely through a hole 49 formed in the pedal and to be retained therein by any suitable means, such as a nut. The push rods are formed at their lower ends with laterally directed spurs 50 pivotally engaged in the bearing 47 and retained by any suitable means, such as snap rings 51. The loose mounting of the bearing on the pedals permits the former to both turn and rock relatively to the pedals.

The lengths of the push rods required to reach from a suitably located control assembly to the pedals may vary considerably between different makes and models of vehicles; wherefore it is expedient to make provision for adjusting the push rods as to length. A convenient and inexpensive way of accomplishing this is to form each push rod in telescopically arranged inner and outer parts 52 and 53, respectively, connected by a bolt 54 passing through any selection of a series of holes 55 formed in one or both of the parts, as shown in Fig. 4.

The operation of the device thus described is very simple and is effected entirely by the driver's left hand, thus leaving the right hand free for steering and gear shifting. Normally, the palm of the hand rests on the handle 36 with the thumb hooked under the assembly between the arm 32 and the handle 36. By a simple rocking of the hand the handle 36 is rotated to rotate the element 21 and cause the arm 34 and link 35 to operate the accelerator pedal. By merely thrusting the handle away from him, the driver swings the assembly downwardly toward the pedals so that the link 25 causes depression of the clutch pedal. By releasing this pressure the clutch is allowed to reengage. The rocking and the thrusting movements of the hand may be combined so as to vary the feeding of fuel as may be desired in relation to the operation of the clutch. To apply brake, the fingers of the left hand are lifted into engagement with the handle 33 and, with the thumb still hooked under the assembly and using the same as a fulcrum, the handle 33 is thrust forwardly and away from the driver so that the arm 32 rotates the element 20 and actuates the arm 30 and link 31 to depress the brake pedal. The forward pressure of the fingers on the handle 33 automatically produces a rearward pull of the thumb on the assembly so that, in ordinary service braking, the assembly does not swing and the clutch pedal is not operated. Also, the application of finger and thumb pressure as aforesaid causes the palm of the hand to automatically lift from the handle 36 so that the accelerator pedal is not operated. For emergency braking, the handle 33 is operated as aforesaid but at the same time the whole hand is thrust forward to swing the assembly and cause depression of the clutch pedal. In ordinary clutch operation, as when changing gears, the driver's fingers will not, normally, be on the handle 33 which is thus free so that, as the assembly swings forward, there is no resistance to movement of the arms 30 and 32 and to rotation of the intermediate element 20 by the relatively stationary brake pedal and push rod 31.

It has been found that, with apparatus as described, a full braking effect can be easily obtained by finger pressure on the handle 33. It has also, been found that the responses of a driver accustomed to the apparatus are somewhat quicker than the responses of a skilled driver using ordinary foot control of the pedals. As all of the clutch, brake and accelerator pedals are controlled by the driver's left hand, there is no time lag and no possibility of confusion or stumbling such as may occur in the moving of a driver's foot onto the pedal to be operated. Both braking and clutch disengagement are accomplished by movement of the driver's hand in a direction away from him, which permits easy application of maximum force and both operations may be accomplished by a single movement of the hand.

If it is desired to apply the invention to a vehicle having an automatic clutch, the clutch push rod 25 may be connected to the brake pedal and the crank 32, handle 33, arm 30 and push rod 31 removed. The brake is then operated by swinging the control assembly away from the driver. In this arrangement, since rotation of the intermediate element 20 is no longer required and is, in fact, undesirable, any suitable means is provided for locking it against rotation in the hub 26 of the outer element and for locking the hub 27 against rotation on the intermediate element 20. One such means may be the provision, as shown in Fig. 2, of threaded openings 56 in the hubs 26 and 27 for application of set screws to engage the intermediate element. The remainder of the outermost element, namely, the spacers 28, 38 and 39 become superfluous and may be removed also. It will be seen that in this arrangement the intermediate element 20 becomes an irrevoluble outer element and is a simple lever swinging about the axis of the stud 22 for actuation of a pedal and contains the relatively revoluble element 21 connected to actuate the accelerator pedal. In the operation of this form of the apparatus, the driver's grip on the handle 36 need never change. The accelerator pedal is depressed by rocking the hand forwardly from the wrist. In applying brakes, the forward movement of the hand automatically causes it to bend back at the wrist so as to reversely rotate the handle 36 and release the accelerator pedal. Obviously, this can be accomplished more quickly than a foot can be moved from accelerator pedal to brake pedal.

In the apparatus described and illustrated, the pivotal mounting of the element assembly has been effected by attaching the pivot stud 22 to the outermost element 19, to which the clutch operating rod is connected, so that it is held against rotation about its axis, while the elements 20 and 21 are independently revoluble within it; but it is to be understood that the element is not limited to this particular relation.

Having thus described our invention, we claim:

1. Apparatus for manual operation of the control pedals of an automotive vehicle, said apparatus comprising an assembly of three relatively revoluble co-axially arranged elements; means for pivotally mounting said assembly near one of its ends in the vehicle; push rod means pivotally connected to one of said elements at a point remote from the pivotal axis of the assembly and formed for pivotal connection to a pedal of the vehicle to operate said pedal upon movement of the assembly about its pivotal axis; and a second push rod means operatively connected to a second of said elements and formed for pivotal connection to a second pedal of the vehicle to operate said pedal upon rotation of said second element relatively to the first said element.

2. Apparatus for manual operation of the control pedals of an automotive vehicle, said apparatus comprising an assembly of at least two co-axially arranged relatively rotatable elements; a pivot stud projecting laterally from the outer of said elements near an end thereof; a push rod connected to said outer element near the opposite end of the assembly and adapted for connection to a pedal of the vehicle; a bracket to be fixed to the vehicle, having an opening therein to receive said stud rotatably, said opening being so inclined with reference to the vehicle as to support said assembly for swinging movement toward the pedals of the vehicle; an arm projecting laterally from an inner of said elements; a push rod connected to said arm and adapted for connection to a second pedal of the vehicle; and means to rotate said inner element.

3. Apparatus for manual operation of the control pedals of an automotive vehicle, said apparatus comprising an assembly of three relatively rotatable elements; means connected to one of said elements near one end of the assembly for mounting said assembly in the vehicle for swinging movement from a normal substantially horizontal position toward the pedals of the vehicle; a push rod connected to said element toward the opposite end thereof from said mounting means and adapted for connection to the clutch pedal of the vehicle; an arm projecting laterally from each of the other said elements, adjacent said mounting means; push rods connected to said arms and adapted for connection to the brake and accelerator pedals, respectively, of the vehicle; and means at the opposite end of said assembly for rotating said other elements independently of one another.

4. Structure according to claim 3, in which the elements are arranged co-axially, each inner element projecting at one end beyond the end of the next outer element for attachment of said arms.

5. Apparatus for manual operation of the control pedals of an automotive vehicle, comprising an assembly of elements pivotally mounted adjacent one of its ends for swinging movement toward the vehicle pedals; said assembly including a pair of independently revoluble elements extending from adjacent the pivotal point to the free end of the assembly; connection between said assembly near its free end and the clutch pedal; connections between the brake and accelerator pedals and said elements adjacent the pivotal point of the assembly; and means on said elements adjacent the free ends thereof for independently rotating the elements to operate the pedals selectively.

References Cited in the file of this patent

UNITED STATES PATENTS

| | | |
|---|---|---|
| 1,229,865 | Bates | June 12, 1917 |
| 1,297,999 | Bryant | Mar. 25, 1919 |
| 2,257,852 | Nicol | Oct. 7, 1941 |
| 2,411,500 | Bradley | Nov. 26, 1946 |

FOREIGN PATENTS

| | | |
|---|---|---|
| 148,600 | Australia | Oct. 13, 1952 |
| 886,718 | France | July 12, 1943 |
| 669,963 | Great Britain | Apr. 9, 1952 |